United States Patent [19]

Kono

[11] Patent Number: 5,305,296
[45] Date of Patent: Apr. 19, 1994

[54] METHOD AND APPARATUS FOR RECORDING INFORMATION ON A RECORDABLE OPTICAL DISC UTILIZING UNRECORDED COUNT AREA TO DETERMINE AVAILABLE TEST AREA

[75] Inventor: Mutsumi Kono, Tokorozawa, Japan

[73] Assignee: Pioneer Electronic Corporation, Tokyo, Japan

[21] Appl. No.: 907,608

[22] Filed: Jul. 2, 1992

[30] Foreign Application Priority Data

Jul. 5, 1991 [JP] Japan .................................. 3-165796

[51] Int. Cl.⁵ .............................................. G11B 7/00
[52] U.S. Cl. ........................................ 369/50; 369/54; 369/116
[58] Field of Search .................... 369/44.26–44.27, 369/44.31, 47, 50, 54, 58, 116

[56] References Cited

U.S. PATENT DOCUMENTS

| | | | |
|---|---|---|---|
| 5,050,156 | 9/1991 | Barton | 369/116 |
| 5,070,495 | 12/1991 | Bletscher, Jr. et al. | 369/116 |
| 5,072,435 | 12/1991 | Bakx | 369/116 X |
| 5,173,886 | 12/1992 | Satoh et al. | 369/116 X |
| 5,185,733 | 2/1993 | Finkelstein et al. | 369/116 X |
| 5,185,734 | 2/1993 | Call et al. | 369/116 |

Primary Examiner—W. R. Young
Attorney, Agent, or Firm—Kane, Dalsimer, Sullivan, Kurucz, Levy, Eisele and Richard

[57] ABSTRACT

A recordable optical disc has a plurality of test areas for effecting test recording therein with a light beam applied thereto which has an optional light intensity, a plurality of count areas for recording count information indicative of whether test recording is effected or not in the test areas, respectively, the count areas being associated respectively with the test areas, and an information recording area for recording information with a light beam applied thereto. The count areas are searched for an unrecorded count area with no count information recorded therein in response to a predetermined command. If at least one unrecorded count area is located, count information is recorded in the located count area. Then, the test areas are searched for one test area which is associated with the located count area in which the count information is recorded. The light beam is applied to the test area to effect test recording therein to measure an optimum light intensity for recording information in the information recording area. Information is then recorded in the information recording area with the light beam applied thereto with the measured optimum light intensity.

7 Claims, 13 Drawing Sheets

FIG. 10
PRIOR ART

| SYNC | MIN | SEC | FRAME | ECC |
|------|-----|-----|-------|-----|
| 4    | 8   | 8   | 8     | 14  |

1 ---- 4  5 ----- 12  13 ---- 20  21 ---- 28  29 -------- 42

FIG.11
PRIOR ART (UNIT: mW)

| 6TH BIT | 7TH BIT | 8TH BIT | RECOMMENDED RECORDING POWER |
|---|---|---|---|
| 0 | 0 | 0 | 4.0 |
| 0 | 0 | 1 | 4.4 |
| 0 | 1 | 0 | 4.9 |
| 0 | 1 | 1 | 5.4 |
| 1 | 0 | 0 | 5.9 |
| 1 | 0 | 1 | 6.6 |
| 1 | 1 | 0 | 7.2 |
| 1 | 1 | 1 | 8.0 |

METHOD AND APPARATUS FOR RECORDING INFORMATION ON A RECORDABLE OPTICAL DISC UTILIZING UNRECORDED COUNT AREA TO DETERMINE AVAILABLE TEST AREA

BACKGROUND OF THE INVENTION

1. Field of the Invention

The present invention relates to a method of and an apparatus for recording information on a recordable optical disc, and more particularly to a method of and an apparatus for measuring and determining an optimum recording power before information is recorded on a recordable optical disc.

2. Description of the Prior Art

There are known compact discs (CD) having diameters of 12 cm and 8 cm. As shown in FIG. 8 of the accompanying drawings, a compact disc has a lead-in area, a program area, and a lead-out area that are arranged successively from an innermost circular boundary on the disc. The compact disc stores a digital signal in the form of an EFM (Eight to Fourteen Modulation) signal. The recorded digital signal includes a main code representing main information such as music information and a subcode such as a time code (Q data) representing time information.

The lead-in area stores index information called TOC (Table of Contents) information. The TOC information contains a subcode indicating the total number of music pieces recorded in the program area, the total playback time of recorded music pieces, and other information. The program area contains a main code representative of music information, Q data of the subcode, track numbers (TNO) indicating the numbers of music pieces, playback times (P-TIME) from the start of the tracks, a total playback time (A-TIME) measured from the track number 1, and other information. The lead-out area contains a lead-out code representing the lead-out area.

The CDs with such a recording format are a medium used for playback only. There has recently been developed a recordable compact disc (R-CD) which has substantially the same format as the conventional CD and which allows additional information to be recorded subsequently. The recording format of the R-CD is referred to as "Orange Book". While the recording format of the R-CD is similar to that of the ordinary CD, it additionally has a PCA (Power Calibration Area) and a PMA (Program Memory Area) that are positioned radially inwardly of the lead-in area, as shown in FIG. 9 of the accompanying drawings.

On tracks of the R-CD, guide grooves are formed being wobbled by the frequency of a carrier of 22.05 KHz which is frequency-modulated by data indicating absolute time information (ATIP: Absolute Time In Pregroove). A laser beam for recording desired information on the R-CD is controlled to follow the guide grooves under tracking control, and the rotational speed of a spindle motor which rotates the R-CD is controlled so that the wobbling guide groove pattern has a central frequency of 22.05 KHz. In this manner, tracking servo and spindle-motor servo processes can be effected on unrecorded R-CDs as well as recorded R-CDs.

The ATIP information will be described below. As shown in FIG. 10 of the accompanying drawings, the ATIP information contains a plurality of frames each composed of 42 bits. The 42 bits of each frame include 4 bits indicative of a sync pattern (SYNC), 8 bits indicative of a minute (MIN), 8 bits indicative of a second (SEC), 8 bits indicative of a frame (FRAME), and 14 bits indicative of an error correcting code (ECC).

The absolute time information represented by the ATIP information equals 1 second in 75 frames as is the case with the Q data of the subcode. In the lead-in area, the absolute time information monotonously increases such that it indicates 99 minutes 59 seconds 74 frames (represented as "99:59:74") at the end of the lead-in area. The absolute time information indicates 00:00:00 at the beginning of the program area, and monotonously increases in the program area.

The manner in which the ATIP information varies across the R-CD is schematically shown in FIG. 12 of the accompanying drawings. The ATIP information in those areas which are radially inward of the program area is indicated by dotted lines, showing that it monotonously increases and indicates 99:59:74 at the end of the lead-in area, as described above. In FIG. 12, the program area has a start frame $t_4$, the lead-in area has a start frame $t_3$, the PMA has a start frame $t_2$, and the PCA has a start frame $t_1$. These $t_1 = t_3 - 00:35:65$
$t_2 = t_3 - 00:13:25$
$t_4 = 00:00:00$.

In addition to the ordinary absolution time information, the ATIP information includes special information encoded by the combination of the most significant bits (MSB) of the 8-bit data which indicate MIN, SEC, and FRAME (in FIG. 10, the combination of the 5th, 13th, and 21th bits as counted from the beginning of the frame). If the combination of the 5th, 13th, and 21th bits is "101", then the information represented by the 6th, 7th, and 8th bits indicates a recommended recording power, i.e., a recording laser beam intensity, for use with the disc. As shown in FIG. 11 of the accompanying drawings, there are eight recommended recording powers indicated by eight combinations of the 6th, 7th, and 8th bits, ranging from "000" to "111". The recommended recording powers are determined under the conditions that the recording laser beam has a wavelength $\gamma$ of 780 nm and is generated at a temperature T of 25° C. Since the wavelength $\gamma$ is temperature-dependent and different objective lenses have different aperture ratios NA, an optimum recording power may not necessarily be the same as any of the recommended recording powers.

The PCA will now be described below. The PCA is an area where test recording is carried out prior to an information recording process, so that the power of the recording laser beam will be optimized for recording desired information in the information recording process. As shown in FIG. 13 of the accompanying drawings, the PCA is composed of a count area CA and a test area TA.

The count area CA has a start frame indicated by ($t_3$—00:15:05) and an end frame indicated by ($t_3$—00:13:25). The count area CA is divided into 100 areas each having one frame, and these divided areas are numbered $C_{100} \sim C_1$ successively radially outwardly. The area $C_1$ has an end frame indicated by ($t_3$—00:13:55). The area $C_1$ is followed by 30 reserved frames in the count area CA.

The test area TA has a start frame indicated by ($t_3$—00:35:65) and an end frame indicated by ($t_3$—00:15:05). The test area TA has innermost 30 reversed frames which are followed by 100 divided areas each having 15 frames, and these divided areas are numbered $T_{100} \sim T_1$ successively radially outwardly. The area $T_1$ has an end frame indicated by ($t_3$—00:15:35). The area $T_1$ is followed by 30 reserved frames in the test area TA.

The areas $C_{100} \sim C_1$ of the count area CA of the above format correspond respectively to the areas $T_{100} \sim T_1$ of the test area TA, and suitable EFM signals are to be recorded in the areas $C_{100} \sim C_1$. Test recording for measuring an optimum recording laser beam power is carried out in the areas $T_{100} \sim T_1$ of the test area TA. This is because the recommended recording powers indicated by the ATIP information may not necessarily be indicative of an optimum recording power. One of the areas $T_{100} \sim T_1$ of the test area TA is consumed by a single test recording cycle. An actual process for measuring an optimum recording laser beam power will be described later on.

Any area $T_n$ of the test area TA which has once been used by test recording is not available for a next test recording cycle. It is therefore necessary to search for an unused area $T_{n+1}$ positioned radially inwardly of the used area $T_n$ for use in the next test recording cycle. The count area CA is provided to facilitate the searching process. More specifically, as shown in FIG. 13, it is assumed that the areas $T_1$, $T_2$, $T_3$ of the test area TA have already been used by test recording. To indicate that the areas $T_1$, $T_2$, $T_3$ have been used, suitable EFM signals are recorded in the corresponding areas $C_1$, $C_2$, $C_3$ of the count area CA, as shown hatched in FIG. 13. No EFM signal is recorded in the area $C_4$ next to the most recently used area $C_3$. The unrecorded area $C_4$ indicates that the corresponding area $T_4$ of the test area TA is available for test recording. Consequently, the area $T_4$ may be searched for and test recording carried out therein for measuring an optimum recording laser beam power. After an optimum recording laser beam power has been measured in the area $T_4$, the area $C_4$ of the count area CA is searched for, and suitable EFM signal is recorded in the area $C_4$, indicating that test recording has already been conducted in the corresponding area $T_4$.

The PMA is an area for storing a recording history of items of information successively recorded in the program area. Specifically, the start addresses and end addresses of track numbers recorded in the program area, for example, are recorded in the PMA in the same format as the TOC information in the lead-in area.

The recording history of successively recorded items of information is stored in the PMA for the following reasons: On a partially recorded disc, information may further be recorded in the remaining blank of the program area. Therefore, the TOC information cannot be recorded in the lead-in area until the completion of recording of all the desired information is finally instructed. Consequently, information about the tracks that have already been recorded is temporarily stored in the PMA. When the user or controller of the disc instructs that no more information will be recorded, the TOC information and a lead-out signal are recorded on the disc. The finalized disc (R-CD), on which the recording of all the necessary information is completed, is then based on the CD format, and can be played back by a disc player for playback only.

After the disc is loaded into a recording apparatus, test recording in the PCA is carried out at least once prior to additional recording of any desired information in the program area. However, if test recording is effected in the PCA at the same time that the disc is loaded into the recording apparatus, then in case the user subsequently ejects the disc without recording any additional information in the program area, the test area TA is unduly consumed. For example, if the user loads and then ejects the disc 100 times without recording any additional information in the program area, then all the test area TA is used up, and no additional information whatsoever can subsequently be recorded in the program area. To eliminate the above drawback, it may be possible to effect test recording only once in the PCA only when the user instructs the recording of information in the program area after the disc is loaded into the recording apparatus.

In the PCA, the areas $T_{100} \sim T_1$ of the test area TA correspond respectively to the areas $C_{100} \sim C_1$ of the count area CA, as described above. After an optimum recording laser beam power is measured in the area $T_n$ of the test area TA, it is necessary to record count information or an EFM signal in the corresponding area $C_n$ of the count area CA. Because of the necessity of recording such count information in the corresponding area $C_n$ of the count area CA, the recording apparatus cannot immediately record additional information in the program area after the test recording. It has heretofore been desired to shorten the time lag that the recording apparatus suffers before it can record additional information in the program area.

SUMMARY OF THE INVENTION

It is an object of the present invention to provide a method of recording information on a recordable optical disc while shortening a period of time required by test recording prior to the recording of information in a program area of the recordable optical disc.

Another object of the present invention is to provide an apparatus for carrying out the above method.

According to the present invention, there is provided a method of recording information on a recordable optical disc having a plurality of test areas for effecting test recording therein with a light beam applied thereto which has an optional light intensity, a plurality of count areas for recording count information indicative of whether test recording is effected or not in the test areas, respectively, the count areas being associated respectively with the test areas, and an information recording area for recording information with a light beam applied thereto, the method including the steps of: searching the plurality of count areas for an unrecorded count area with no count information recorded therein in response to a predetermined command; if at least one unrecorded count area is located, recording count information in the unrecorded count area; then, searching the plurality of test areas for one test area which is associated with the count area in which the count information is recorded; applying the light beam to the test area to effect test recording therein to measure an optimum light intensity for recording information in the information recording area; and recording information in the information recording area with the light beam applied thereto with the measured optimum light intensity.

According to the present invention, there is also provided an apparatus for recording information on a recordable optical disc having a plurality of test areas for effecting test recording therein with a light beam applied thereto which has an optional light intensity, a plurality of count areas for recording count information indicative of whether test recording is effected or not in the test areas, respectively, the count areas being associated respectively with the test areas, and an information recording area for recording information with a light beam applied thereto, the apparatus including: optical pickup device for applying a light beam to the recordable optical disc to read information from and recording information on the recordable optical disc; transfer device for transferring the optical pickup device radially over the recordable optical disc; power supply device for energizing the optical pickup device to emit the light beam; and control unit for controlling the optical pickup device, the transfer device, and the power supply device. The control device including: unit for actuating the transfer device to search the plurality of count areas for an unrecorded count area with no count information recorded therein in response to a predetermined command; unit for, if at least one unrecorded count area is located, energizing the optical pickup device with the power supply device to record count information in the unrecorded count area; unit for actuating the transfer device to search the plurality of test areas for one test area which is associated with the count area in which the count information is recorded; unit for controlling the pickup device with the power supply device to apply the light beam to the test area to effect test recording therein to measure an optimum light intensity for recording information in the information recording area; and unit for controlling the pickup device with the power supply device to record information in the information recording area with the light beam applied thereto with the measured optimum light intensity.

When an unrecorded count area is located, count information is first recorded in the located count area. Then, after an optimum light beam intensity is measured and determined in the test area which corresponds to the located count area, desired information is immediately recorded in the information recording area. Therefore, the recording process becomes shorter than the conventional recording process, and hence the operation of the apparatus is speeded up.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 10 and 11 are diagrams showing a format of ATIP information on the R-CD;

DETAILED DESCRIPTION OF THE PREFERRED EMBODIMENT

Figure 1:
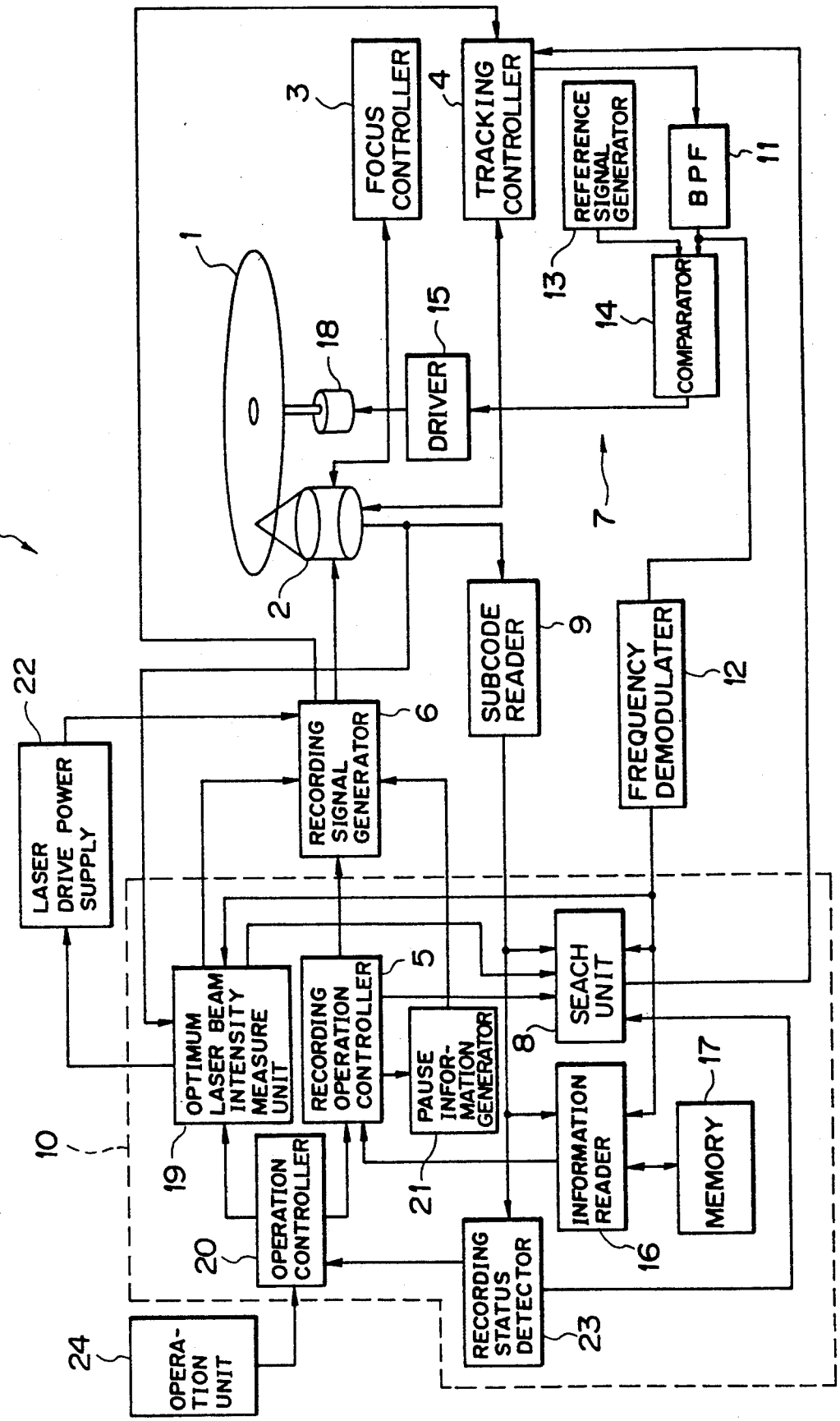
FIG. 1 is a block diagram of an apparatus for recording information on a recordable optical disc according to the present invention.

FIG. 1 shows in block form an apparatus for recording information on a recordable optical disc according to the present invention.

The apparatus, generally designated by the reference numeral 100 in FIG. 1, includes an optical pickup 2, a spindle motor 18, a focus control system 3, a tracking control system 4, a spindle motor control system 7, a recording signal generator 6, a subcode reader 9, a frequency demodulator 12, a laser drive power supply 22, and a operation unit 24. The apparatus 100 also has a playback function.

The spindle motor 18 rotates an optical disc 1 in the form of a recordable optical disc. While the optical disc 1 is being rotated by the spindle motor 18, the optical pickup 2 applies a laser beam to record or reproduce desired information on and from the optical disc 1. The optical disc 1 has one surface coated with a thin recording layer made of a known material such as cyanine dye or the like.

The optical disc 1 has a PCA, PMA, a lead-in area, a program area, and a lead-out area which are basically the same as those of the R-CD shown in FIGS. 9 through 13.

The rotational speed of the spindle motor 18 which rotates the optical disc 1 is controlled by the spindle motor control system 7 under servo control. The spindle motor control system 7 controls the rotational speed of the spindle motor 18 so that the wobbling frequency produced from the guide grooves of the optical disc 1 will be equalized to a predetermined frequency. If the optical disc 1 is a recorded disc, then the spindle motor control system 7 controls the rotational speed of the spindle motor 18 so that the clock signal in a reproduced signal from the optical disc 1 will have a predetermined frequency.

The focus control system 3 controls movement of the optical pickup 2 toward and away from the recording surface of the optical disc 1 for focusing the laser beam from the optical pickup 2 accurately onto the recording surface of the optical disc 1. The tracking control system 4, a slider servo system, a slider mechanism, and an actuator (not shown) jointly control movement of the optical pickup 2 in the radial direction of the optical disc 1 to enable the laser beam from the optical pickup 2 to follow tracks on the optical disc 1.

The optical pickup 2 reads a recorded signal, representing recorded information, from the optical disc 1 with a laser beam applied to and reflected from the optical disc 1. The subcode reader 9 extracts a subcode from the signal read from the optical disc 1. The data of the subcode includes data (Q data) indicative of playback time of the information recorded on the optical disc 1. If the optical disc 1 is a recorded disc, then the subcode may be employed to establish a target address. The subcode reader 9 may includes an EFM demodulator for demodulating the read signal and a decoder for decoding a subcode signal from the demodulated signal.

If the optical disc 1 is an unrecorded disc, then since no subcode is available from the optical disc 1, absolute time information on the optical disc 1 is obtained using ATIP information as track information. More specifically, because the tracks on the optical disc 1 are wobbled, a tracking error signal is produced by the tracking control system 4. The tracking error signal is supplied to a band-pass filter 11, which extracts a wobbling frequency band (whose central frequency is 22.05 KHz, for example) from the tracking error signal. The output signal, indicating the extracted wobbling frequency band, from the band-pass filter 11 is supplied to the frequency demodulator 12 to detect ATIP information. The output signal from the band-pass filter 11 is also compared with a reference frequency signal from a reference signal generator 13 by a comparator 14. The comparator 14 applies an output signal to a motor driver 15 for the spindle motor 18.

An information reading circuit 16 reads TOC information from the optical disc 1 and stores the read TOC information in a memory 17 such as a RAM. The information reading circuit 16 is connected to an output terminal of the frequency demodulator 12 and an output terminal of the subcode reader 9. A recording operation control circuit 5 controls recording operation of the apparatus in response to commands from an operation control circuit 20. Specifically, the recording operation control circuit 5 controls the recording signal generator 6 according to data supplied from the information reading circuit 16. An optimum laser beam intensity measuring circuit 19 is responsive to a command from the operation control circuit 20 for recording information in a PCA on the optical disc 1 while gradually varying the magnitude of an electric current supplied to a laser diode of the optical pickup 2, and subsequently reproducing recorded information to measure an optimum recording laser beam intensity. The optimum laser beam intensity measuring circuit 19 is supplied with the signal read from the optical disc 1 by the optical pickup 2 and the output signal from the frequency demodulator 12, and supplies control signals to the laser drive power supply 22 which energizes the recording signal generator 6 for generating a recording signal to be supplied to the laser diode of the optical pickup 2, the recording signal generator 6, and a search circuit 8.

The recording signal generator 6 includes an encoder for encoding program information, such as music information from a certain program source, and an associated subcode, according to control signals from the recording operation control circuit 5 and the optimum laser beam intensity measuring circuit 19, and an EFM modulator for modulating the encoded signal from the encoder. The recording signal generator 6 supplies the modulated signal to the optical pickup 2. To the recording signal generator 6, there is connected a pause information generator 21 for supplying pause information as subcode data to the recording signal generator 6. The contents of the pause information from the pause information generator 21 are controlled according to the control signal from the recording operation control circuit 5.

The operation control circuit 20 supplies various commands to the recording operation control circuit 5 and the optimum laser beam intensity measuring circuit 19 based on signals that are applied from the operation unit 24 in response to key strokes thereof which are inputted by the user. The operation control circuit 20 is supplied with data indicative of unused areas of the PCA of the optical disc 1 from a recording status detector 23. The operation control circuit 20 supplies the data indicative of unused areas of the PCA, together with a command for starting to measure an optimum laser beam intensity, to the optimum laser beam intensity measuring circuit 19.

The recording status detector 23 controls the search circuit 8 to move the optical pickup 2 radially inwardly over the optical disc 1 to search for an unused area of the test area TA in the PCA. Specifically, the recording status detector 23 detects an area $C_n$ of the count area CA where no EFM signal is recorded, thereby determining a corresponding unused area $T_n$ of the test area TA.

The search circuit 8 applies a drive signal to the tracking control system 4 for transferring the optical pickup 2 radially in a desired mode. The search operation effected by the search circuit 8 is commanded by the recording operation control circuit 5, the optimum laser beam intensity measuring circuit 19, and the recording status detector 23. The search circuit 8 is supplied with subcode data and ATIP data for recognizing a present position over the optical disc 1.

The recording operation control circuit 5, the search circuit 8, the information reading circuit 16, the memory 17, the optimum laser beam intensity measuring circuit 19, the operation control circuit 20, the pause information generator 21, and the recording status detector 23 may be software-implemented by a microcomputer 10. If these components are software-implemented by the microcomputer 10, then their operation is carried out by the central processing unit of the microcomputer 10 according to a program stored in a ROM of the microcomputer 10. It is hereinafter assumed that the functions of the above components are performed by the microcomputer 10.

The program for controlling the operation of the apparatus will be described below with reference to FIGS. 2 through 7. The recording operation control circuit 5, the search circuit 8, the information reading circuit 16, the optimum laser beam intensity measuring circuit 19, the operation control circuit 20, the pause information generator 21, and the recording status detector 23 which are referred to in the description of the program actually indicate their functions performed by the microcomputer 10. It is assumed that the optical disc 1 is an R-CD which is already loaded in the apparatus for recording additional information.

Figure 2:
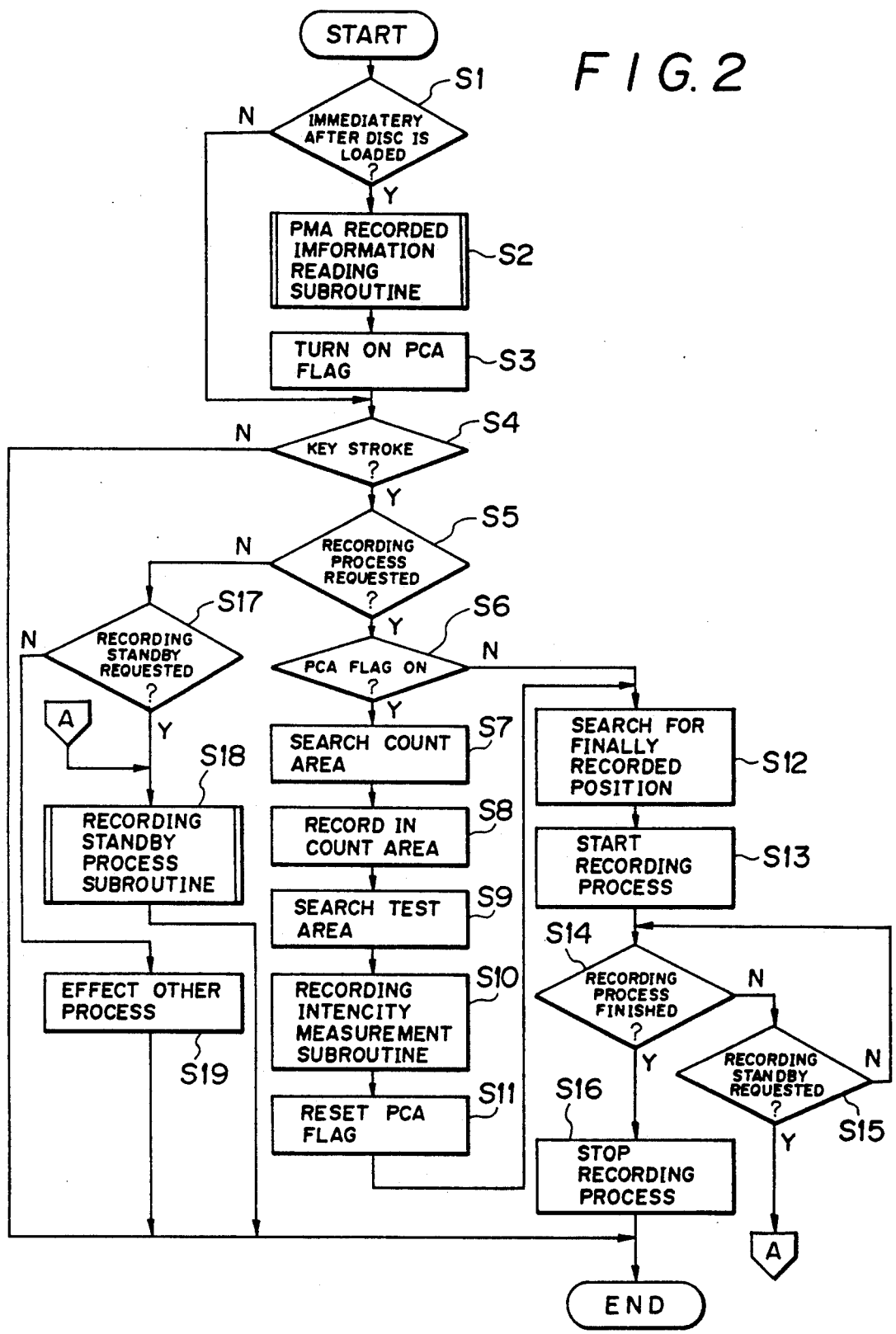
FIGS. 2, 3, 4 and 5 are flow charts of an operation sequence of the apparatus shown in FIG. 1.

FIG. 2 shows a main routine of the program. In FIG. 2, a step S1 determines whether or not the present time is immediately after the optical disc 1 is loaded in the apparatus. Specifically, the step S1 is executed by determining whether information recorded in the PMA of the optical disc 1 has been read or whether index information obtained from the information recorded in the PMA has been recorded in a certain memory.

If the present time is immediately after the optical disc 1 is loaded in the apparatus, then a step S2 executes a subroutine for reading the information recorded in the PMA. If the subroutine for reading the information recorded in the PMA has already been executed and the index information stored in the memory, then control goes to a step S3.

Figure 3:
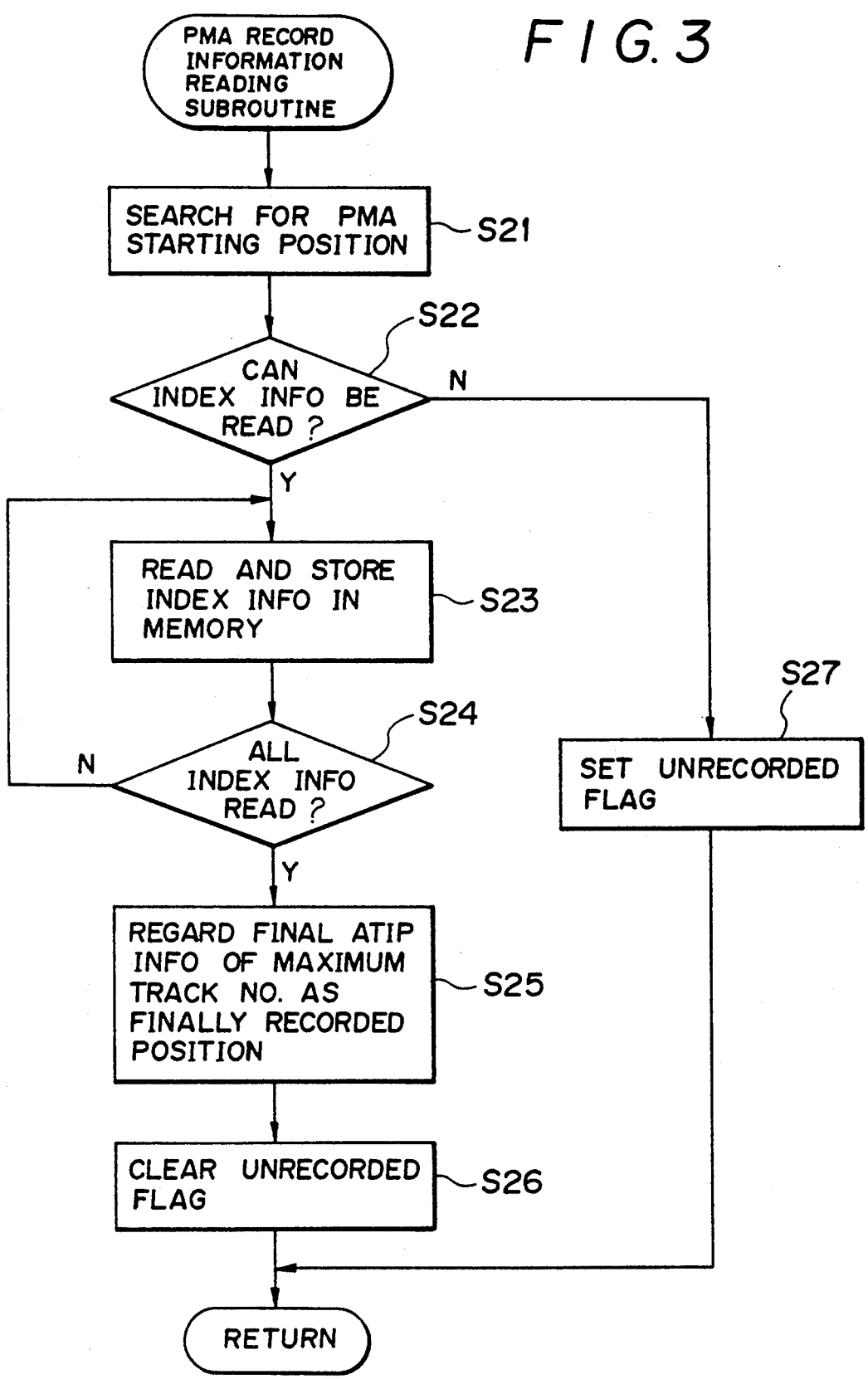

The subroutine for reading the information recorded in the PMA is shown in FIG. 3. In this routine, a start position of the PMA is first searched for in a step S21. Specifically, the information reading circuit 16 shown in FIG. 1 supplies a jump control signal indicating a jump to the PMA start position to the tracking control system 4 and the slider servo system (not shown). After the PMA start position is searched for, a step S22 determines whether index information can be read from a subcode signal produced from the PMA by the subcode reader 9. The index information contains track numbers TNO, and starting ATIP data and ending ATIP data for each of the track numbers TNO. As described above, the PMA is an area for storing a recording history of items of program information such as of additionally recorded music information.

If index information can be read in the step S22, then it is read and stored in the memory 17 in a step S23. Then, a step S24 determines whether the reading of all the index information in the PMA is finished or not. The step S23 is continuously carried out insofar as there is index information that can be read from the PMA subcode signal. If the reading of all the index information in the PMA is finished in the step S24, then the ending ATIP data for a maximum track number $N_{max}$ read from the PMA is regarded as a final recording position in a step S25, and an unrecorded flag is cleared in a step S26. The subroutine for reading the information recorded in the PMA is effected by the information reading circuit 16. The data of the final recording position and the unrecorded flag are supplied to the recording operation control circuit 5. If no index information can be read in the step S22, then the unrecorded flag is set in a step S27, and control goes back to the main routine shown in FIG. 2. At the same time, a recommended recording power obtained from the ATIP information is read and stored in a memory (not shown).

After the subroutine shown in FIG. 3, a PCA flag is turned on in a step S4, which is followed by a step S4 that determines whether a key of the operation unit 24 is pressed or not. If a key is pressed, then a step S5 determines whether the pressed key is a key (REC key) for requesting a recording process. If the pressed key is not the REC key in the step S5, then control goes to a step S17 (described later on).

If the pressed key is the REC key in the step S5, then a step S6 determines whether the PCA flag is on or not. If the PCA flag is on, then the areas of the count area CA in the PCA are successively accessed radially inwardly to search for an area $C_n$ where no EFM signal is recorded in a step S7. If the area $C_n$ is located, then it is determined that the area $T_n$ of the test area TA which corresponds to the located area $C_n$ is an area where an optimum recording power is to be measured. Then, the recording status detector 23 issues a searching command to enable the search circuit 8 to apply a jump control signal to the tracking control system 4 and the slider servo system. After the area $C_n$ where no EFM signal is recorded is located in the step S7, a suitable EFM signal is recorded in the area $C_n$ with the recommended recording power stored in the memory in a step S8. Thereafter, a step S9 searches for an area $T_n$ of the test area TA which corresponds to the area $C_n$ of the count area CA.

Then, the optimum laser beam intensity measuring circuit 19 executes a subroutine for measuring a recording laser beam intensity in a step S10.

Figure 4:
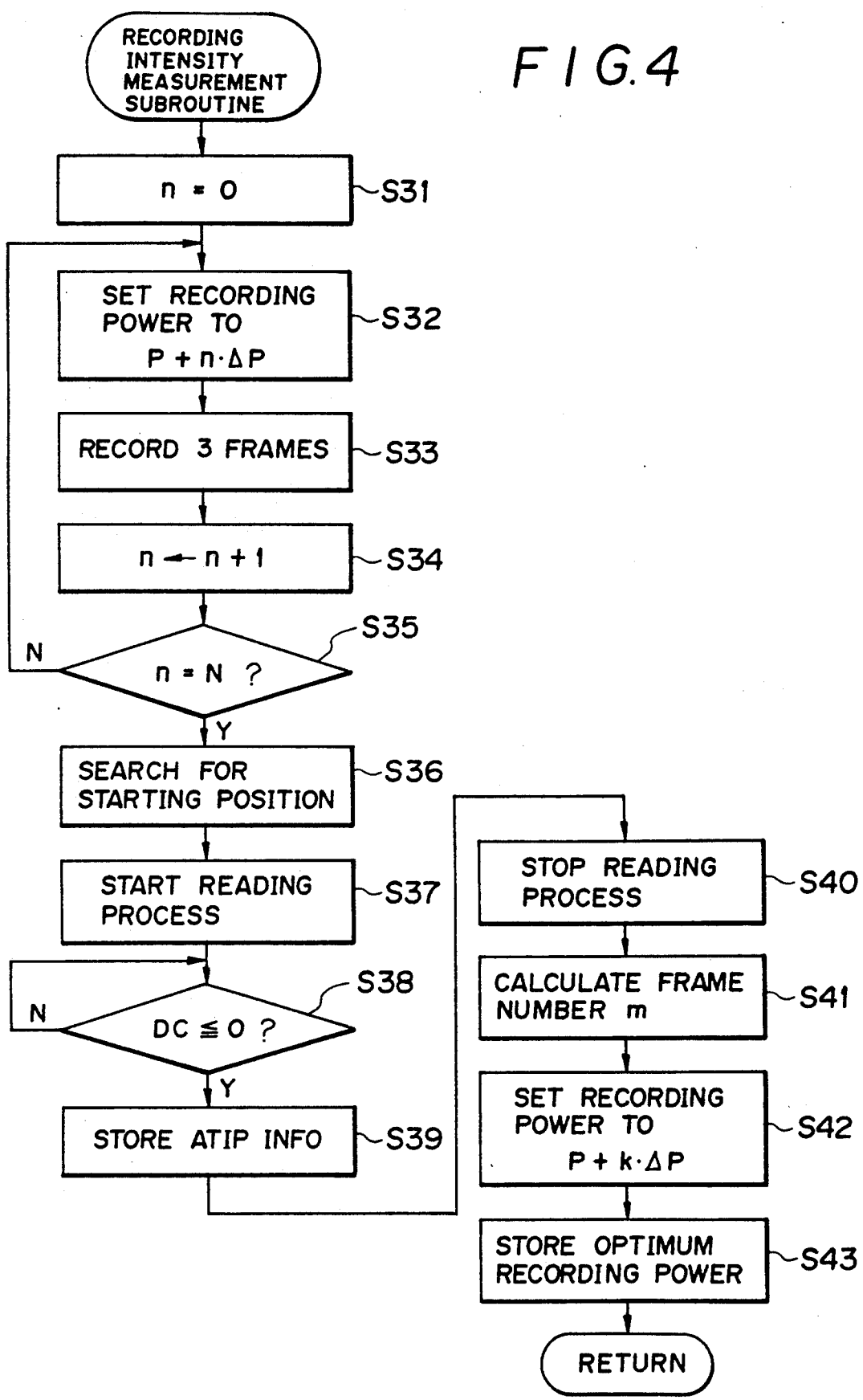

FIG. 4 shows the subroutine for measuring a recording laser beam intensity. In FIG. 4, the count n of a counter in the optimum laser beam intensity measuring circuit 19 is reset to "0" in a step S31. Then, the optimum laser beam intensity measuring circuit 19 supplies a control signal to the laser drive power supply 22 to cause the laser diode in the optical pickup 2 to emit a laser beam having an intensity of $(P+n \cdot \Delta P)$ in a step S32, where P is an optimum laser beam intensity required to form a pit in the optical disc 1, and $\Delta P$ a change in the laser beam intensity.

Then, a test recording process is carried out by recording predetermined information in 3 frames in the area $T_n$ of the test area TA in a step S33. The count n of the counter is incremented by 1 in a step S34. Thereafter, a step S35 determines whether the count n is equal to a predetermined count N or not. If the count n is not equal to the predetermined count N, then control returns to the step S32. If the count n is equal to the predetermined count N, then the test recording process is finished, and the starting position of the area $T_n$ is searched for in a step S36. That is, the optimum laser beam intensity measuring circuit 19 supplies the search circuit 8 with a command to search for the starting position of the area $T_n$. Then, a reading process is started to read the area $T_n$ in a step S37, which is followed by a step S38 that determines whether or not the level of a DC component of a read signal from the optical pickup 2 is equal to or lower than 0. If the level of the DC component of the read signal is higher than 0, then the step S38 is executed again. If the level of the DC component of the read signal is equal to or lower than 0, then ATIP information at the time is temporarily stored in a register in the optimum laser beam intensity measuring circuit 19 in a step S39. The reading process is then finished in a step S40. Based on the ATIP data stored in the step S39, a step S41 determines the number m of frames counted from the starting position of the area $T_n$ at the moment the level DC of the DC component of the read signal is equal to or lower than 0. In a next step S42, the optimum laser beam intensity measuring circuit 19 supplies the laser drive power supply 22 with a control signal to enable the laser diode in the optical pickup 2 to emit a laser beam having an intensity of $(P+k \cdot \Delta P)$ in a recording process, where k is a greatest integer equal to or smaller than m/3. The laser beam intensity of $(P+k \cdot \Delta P)$ is stored as an optimum recording power in the memory in a step S43.

Figure 6A:
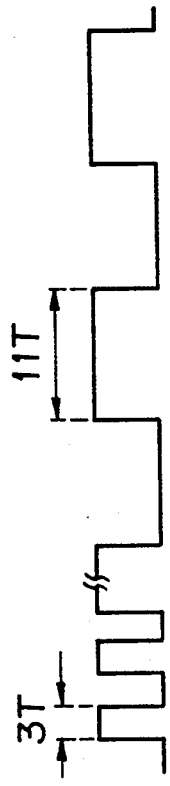
FIG. 6(A-E) and 7 are diagrams illustrative of the manner in which the apparatus shown in FIG. 1 operates.
Figure 6B:
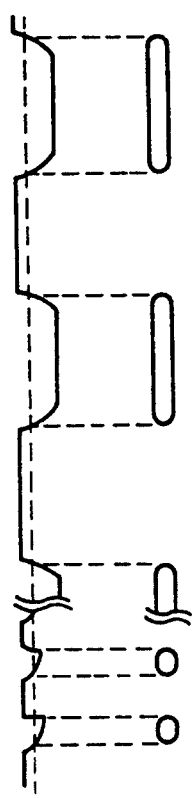
Figure 6C:
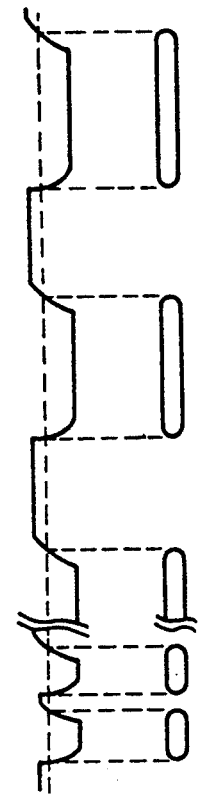
Figure 6D:
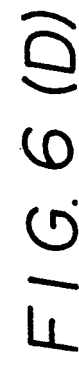
Figure 6E:
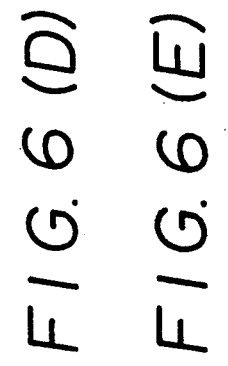
Figure 7:
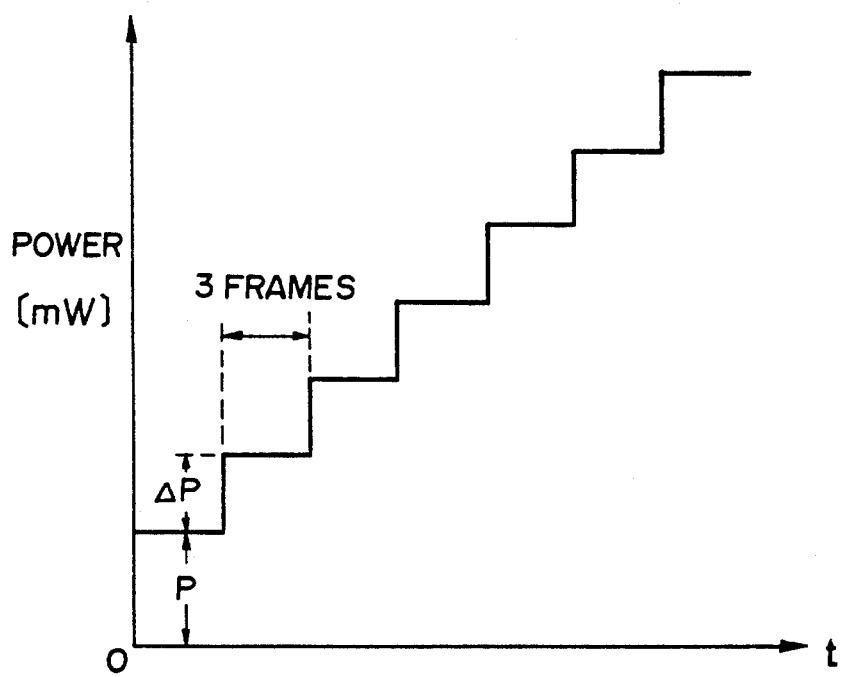
Figure 8:
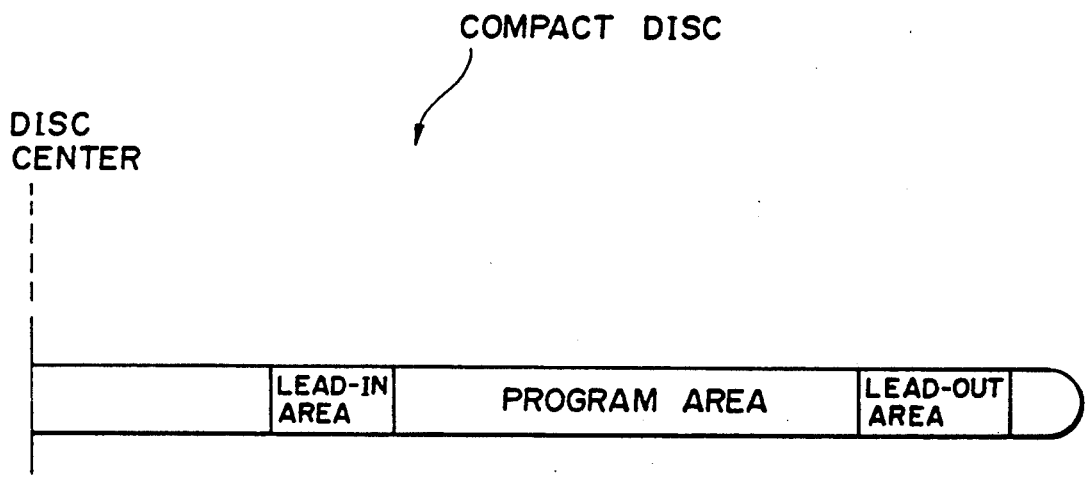
FIG. 8 is a diagram of recording areas on a CD.
Figure 9:
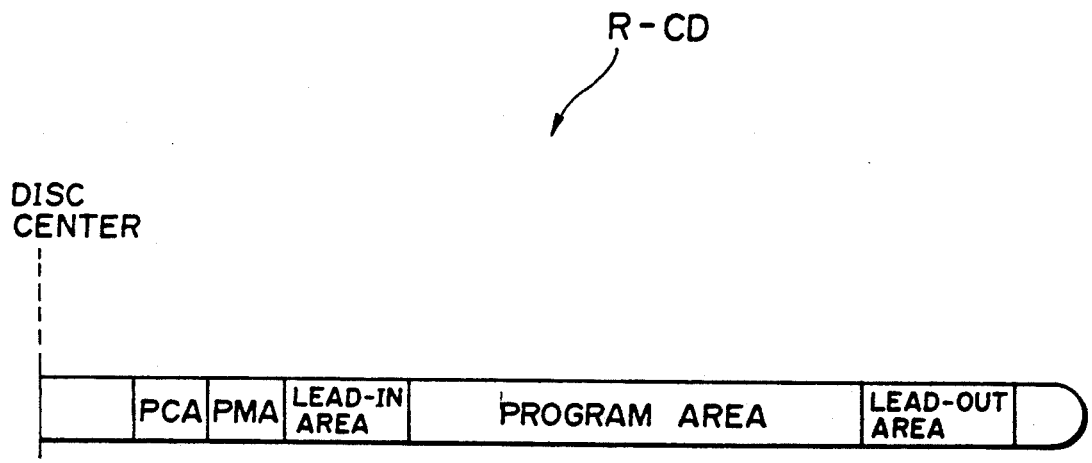
FIG. 9 is a diagram of recording areas on a R-CD.
Figure 12:
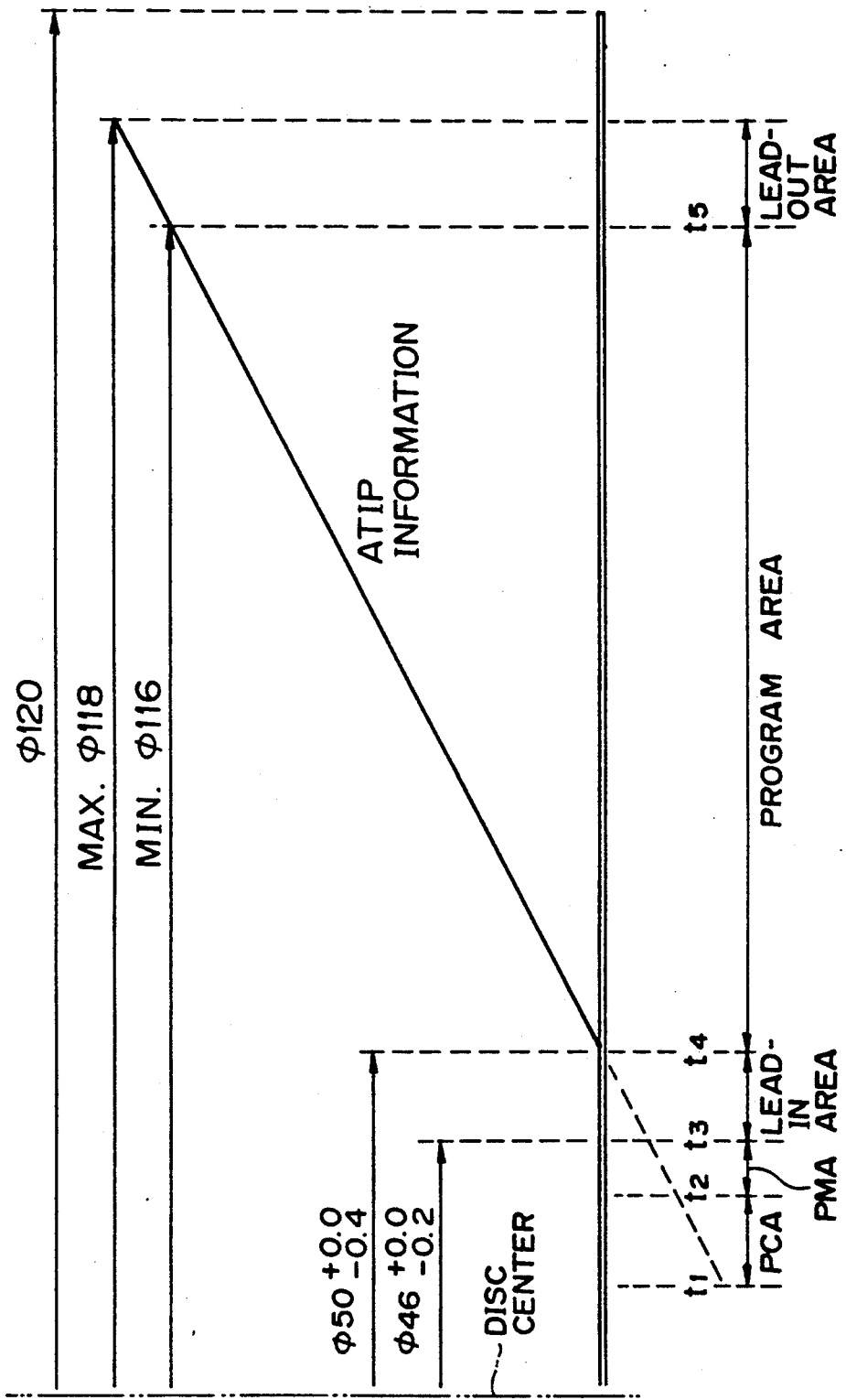
FIG. 12 is a diagram showing the manner in which the ATIP information varies across the R-CD.
Figure 13:
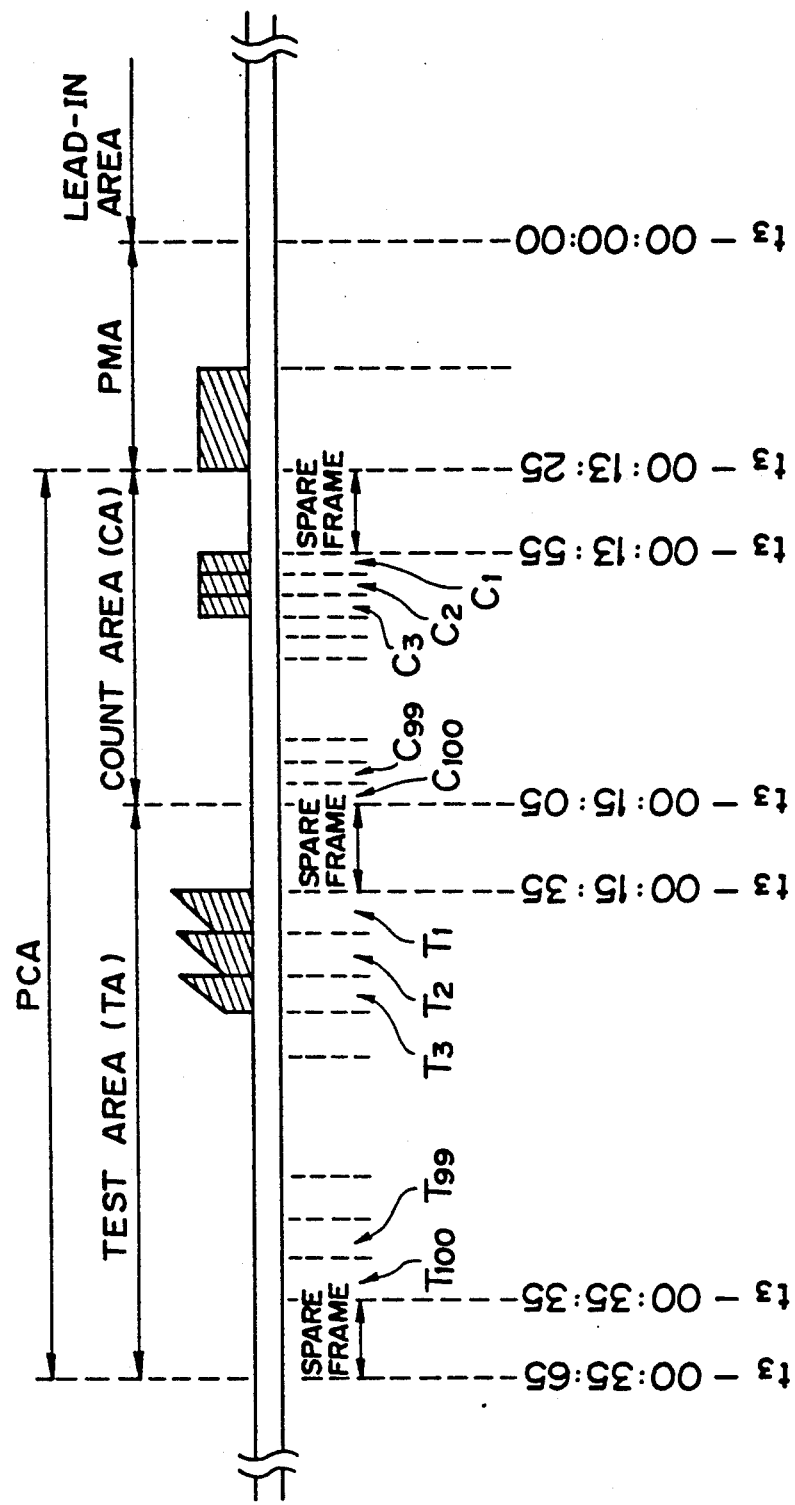
FIG. 13 is a diagram of a format of a PCA on the R-CD.

The subroutine shown in FIG. 4 is described in greater detail below. In this subroutine, the recording signal generator 6 generates a recording signal representing predetermined information as shown in FIG. 6A and supplies the recording signal to the laser diode in the optical pickup 2. The recording signal generated by the recording signal generator 6 is EFM-modulated, and is in the form of a run-length-limited code signal which has periods of continuously high or low level limited to a range of from 3T to 11 T (T is a unit time), and has a DC component level of 0, as shown in FIG. 6A. The recording laser beam whose intensity is gradually increased stepwise as shown in FIG. 7 in the steps S31 through S35 is recorded in the test area TA. If the recording laser beam intensity were too low, pits formed in the recording surface of the optical disc 1 would be too small as shown in the cross-sectional view of FIG. 6B and shorter than the pulses of the recording signal as shown in the plan view of FIG. 6C. As a result, the DC component of the signal read from the pits thus formed would be relatively positive. Conversely, if the recording laser beam intensity were too high, pits formed in the recording surface of the optical disc 1 would be too large as shown in the cross-sectional view of FIG. 6D and longer than the pulses of the recording signal as shown in the plan view of FIG. 6E. As a result, the DC component of the signal read from the pits thus formed would be relatively negative.

The steps S36 through S38 detect the position where the DC level of the DC component of the read signal is equal to or lower than 0, and the recording laser beam intensity used to record the information in the detected position is calculated as the optimum recording power in the steps S39 through S42. The subroutine shown in FIG. 4 allows pits of desired lengths to be formed in the recording surface of the optical disc 1 even if different optical discs have different recording sensitivities. Therefore, desired information can well be recorded on the optical signal 1.

After the step S10 in FIG. 2, the PCA flag is reset in a step S11, and a command to search for a finally recorded position on the optical disc 1 is issued in a step S12. The search circuit 8 controls the tracking control system 4, the slider servo system, and the slider mechanism to cause the optical pickup 2 to search for and reach the finally recorded position on the optical disc 1, based on the ATIP information stored in the register. If the optical disc 1 is an unrecorded disc, then a command is issued to search for a predetermined recording starting position in the program area in the optical disc 1.

After the step S12, a recording starting command is supplied to the recording operation control circuit 5 to start a recording process for recording desired information on the optical disc 1 in a step S13. Thereafter, a step S14 determines whether the recording process is to be finished or not. The step S14 is normally executed by determining whether a STOP key of the operation unit 24 is pressed or not, but may also be executed by determining whether a failure such as a servo control failure has occurred or not.

If the recording process is not to be finished, then a step S15 determines whether a request for a recording standby process is inputted by a key stroke from the operation unit 24. If no recording standby request is inputted, then control goes back to the step S14. If the recording standby request is inputted, then control jumps to a step S18 (described later on). If the recording process is to be finished in the step S14, then a command to stop the recording process is supplied to the recording operation control circuit 5 to stop the recording process in a step S16. The steps S11 through S16 are carried out by the operation control circuit 20. After the step S16, the main routine shown in FIG. 2 is ended.

If the pressed key is not the REC key of the operation unit 24 in the step S5, the step S17 determines whether the pressed key is a key for making the recording standby request or not. If the pressed key is not the key for making the recording standby request, then any other commanded process than the recording process or the recording standby process, e.g., a process for ejecting the optical disc 1 or a process for recording index information in the PMA, is carried out in a step S19. The main routine is then finished after the step S19.

If the pressed key is the key for making the recording standby request in the step S17, then a subroutine for a recording standby process is executed in the step S18.

Figure 5:
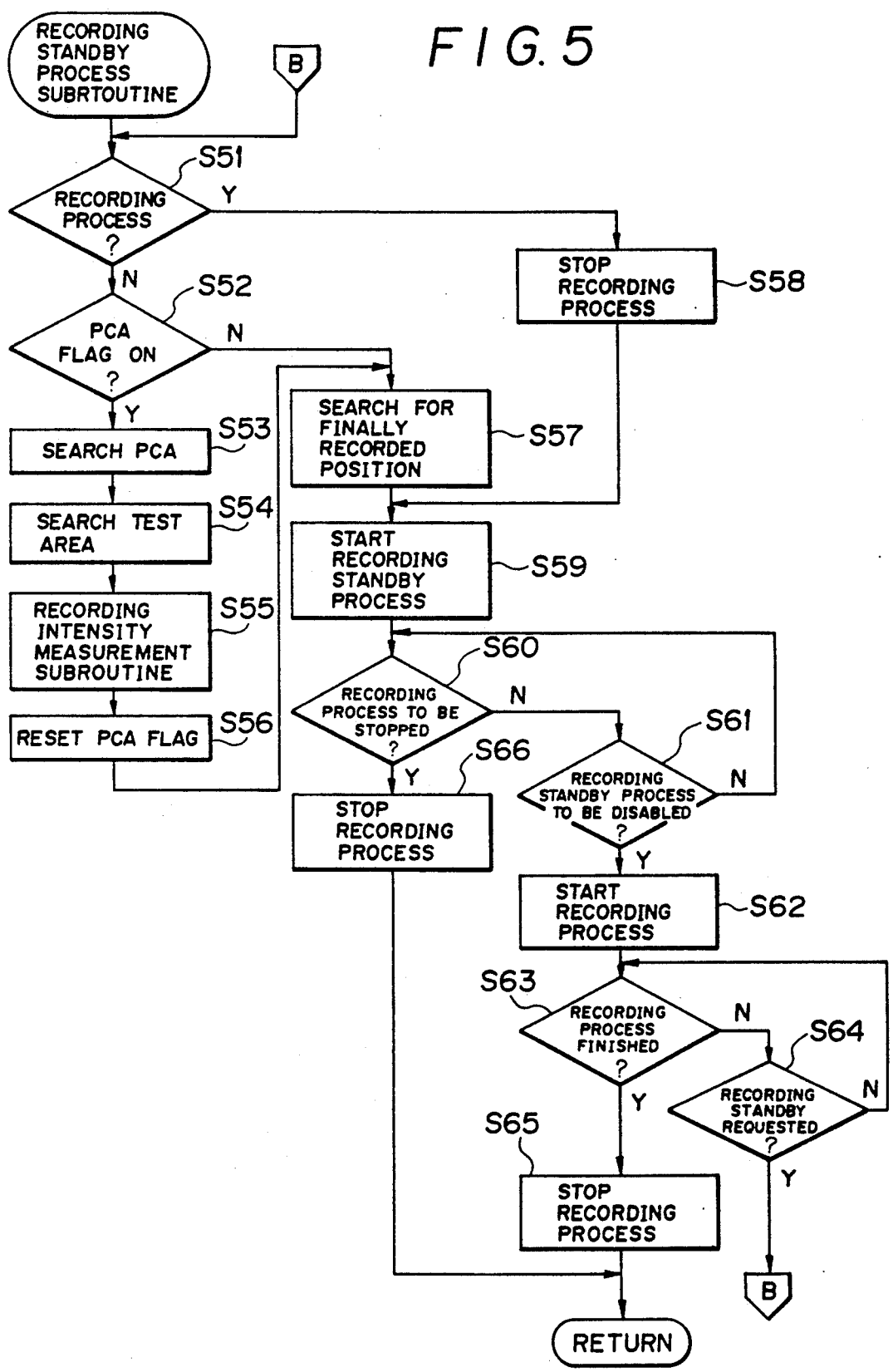

The subroutine for a recording standby process is shown in FIG. 5. First, a step S51 determines whether the apparatus is in the recording process or not. The step S51 may be executed as follows: When the command for the recording process is applied to the recording operation control circuit 5, a recording mode flag is set. Therefore, whether the recording process is being carried out or not can be determined by checking the recording mode flag. The recording mode flag is checked by the operation control circuit 20. If the apparatus is in the recording process, then a command to stop the recording process is applied to the recording operation control circuit 5, thereby stopping the recording process in a step S58. Then, control goes to a step S59 (described later on). If the apparatus is not in the recording process, steps S52 through S57 which are similar to the steps S6 through S12 are executed to measure an optimum recording power.

Thereafter, a recording standby command is supplied to the recording operation control circuit 5 to start a recording standby process in a step S59. In the recording standby process, one frame of pause information is recorded on the optical disc 1, and thereafter the pause information is executed to form a pause area, and a jump command, for example, is supplied to the tracking control system 4 at a final recording position in the pause area for thereby keeping the optical pickup 2 in the pause area. A track number TNO and an index number INDEX at the time the recording standby command is issued are maintained as the pause information. A time period which is obtained by subtracting a 01 frame from a playback time PTIME in the track number which indicates the final recording position in the pause area becomes a playback time PTIME in the track number at the time the pause information starts being recorded. In recording the pause information, the contents of the pause information produced by the pause information generator 21 are controlled according to a control signal from the recording operation control circuit 5.

After the step S59, a step S60 determines whether the recording process is to be stopped or not. The step S60 is normally executed by determining whether the STOP key of the operation unit 24 is pressed or not, but may also be executed by determining whether a failure such as a servo control failure has occurred or not.

If the recording process is not to be stopped in the step S60, a step S61 determines whether a request to disable the recording standby process is made or not by determining whether the REC key of the operation unit 24 is operated on or not. If no request to disable the recording standby process is made, then control goes back to the step S60. If a request to disable the recording standby process is made, then steps S62 through S65 which are identical to the steps S13 through S16 are carried out, and then the subroutine shown in FIG. 5 is ended. If the recording process is to be stopped in the step S60, then a command to stop the recording process is supplied to the recording operation control circuit 5, thus stopping the recording process in a step S66. Thereafter, the subroutine shown in FIG. 5 is ended.

As described above, an optimum recording laser beam intensity is measured only immediately prior to a recording process or a recording standby process immediately after the optical disc 1 has been loaded in the apparatus. Therefore, the number of cycles for measuring an optimum recording laser beam intensity is reduced. Furthermore, the recording of an EFM signal in the count area CA is not effected after, but carried out before, an optimum recording laser beam intensity is measured in the test area TA of the PCA. Thus, the apparatus can quickly enter the recording process for recording desired information in the program area after an optimum recording laser beam intensity is measured in the test area TA of the PCA.

Since desired information can be recorded in the program area right after an optimum recording laser beam intensity is measured, any time lag that may be present after the user instructs the apparatus to record the desired information can be minimized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of recording information on a recordable optical disc having a plurality of test areas for effecting test recording therein with a light beam applied thereto which has an optional light intensity, a plurality of count areas for recording count information indicative of whether test recording is effected or not in the test areas, respectively, said count areas being associated respectively with said test areas, and an information recording area for recording information with a light beam applied thereto, said method comprising the steps of:

searching said plurality of count areas for an unrecorded count area with no count information recorded therein in response to a predetermined command;
 if at least one unrecorded count area is located, recording count information in said one unrecorded count area;
 searching said plurality of test areas for one test area which is associated with said one count area in which the count information is recorded;
 applying the light beam to said one test area to effect test recording therein to determine as optimum light intensity for recording information in said information recording area, said count information recording step preceding said test area recording step; and
 recording information in said information recording area with the light beam applied thereto with the determined optimum light intensity.

2. A method according to claim 1, wherein said light beam applying step comprises the steps of:

applying an initial light beam having an initial light intensity onto said one test area to effect test recording therein;
 increasing the light intensity of the light beam by a predetermined intensity value;
 applying the light beam having the increased light intensity onto a test area next to said one test area to effect test recording therein;
 repeating said light intensity increasing step and said light beam applying step until the increased light intensity becomes equal to a predetermined test ending intensity; and
 reading the test areas on which the test recordings are performed so as to determine an optimum light intensity on the basis of signals read from the test areas.

3. A method according to claim 1, wherein said predetermined command includes a recording instruction command for recording desired information on the information recording area.

4. A method according to claim 1, wherein said predetermined command includes a recording standby command to become a standby state waiting for a recording instruction command to start recording desired information on the information recording area.

5. An apparatus for recording information on a recordable optical disc having a plurality of test areas for effecting test recording therein with a light beam applied thereto which has an optional light intensity, a plurality of count areas for recording count information indicative of whether test recording is effected or not in the test areas, respectively, said count areas being associated respectively with said test areas, and an information recording area for recording information with a light beam applied thereto, said apparatus comprising:

optical pickup means for applying a light beam to said recordable optical disc to read information from and recording information on the recordable optical disc;
 transfer means for transferring said optical pickup means radially over said recordable optical disc;
 power supply means for energizing said optical pickup means to emit the light beam; and
 control means for controlling said optical pickup means, said transfer means, and said power supply means;
 said control means comprising:
  means for actuating said transfer means to search said plurality of count areas for an unrecorded count area with no count information recorded therein in response to a predetermined command;
  means for, if at least one unrecorded count area is located, energizing said optical pickup means with said power supply means to record count information in said one unrecorded count area;
  means for actuating said transfer means to search said plurality of test areas for one test area which is associated with said one count area in which the count information is recorded;
  means for controlling said pickup means with said power supply means to apply the light beam to said one test area to effect test recording therein to determine an optimum light intensity for recording information in said information recording area; and
  means for controlling said pickup means with said power supply means to record information in said information recording area with the light beam applied thereto with the determined optimum light intensity, wherein said power supply means records count information in said unrecorded count area prior to the search of the test area which is associated with said unrecorded count area.

6. An apparatus according to claim 5, wherein said predetermined command includes a recording instruction command for recording desired information on the information recording area.

7. An apparatus according to claim 5, wherein said predetermined command includes a recording standby command for allowing said control means to be in a standby state waiting for a recording instruction command to start recording desired information on the information recording area.

* * * * *